April 19, 1927.
L. A. PAGE
EXTENDIBLE SPECTACLE TEMPLE
Filed Jan. 21, 1926
1,625,050
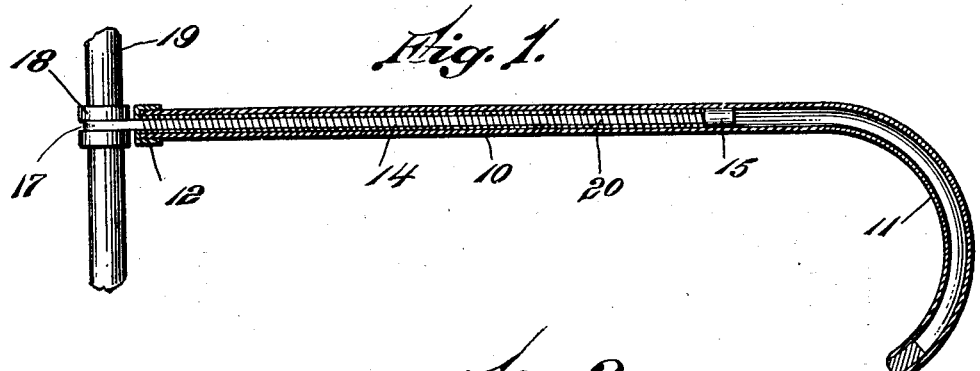
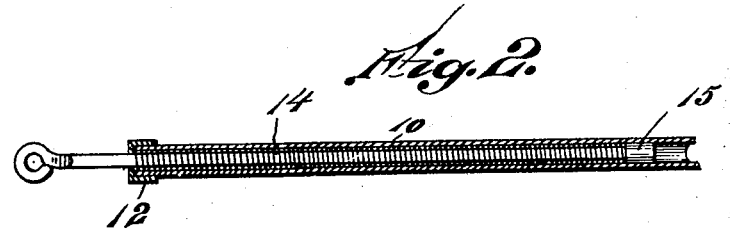
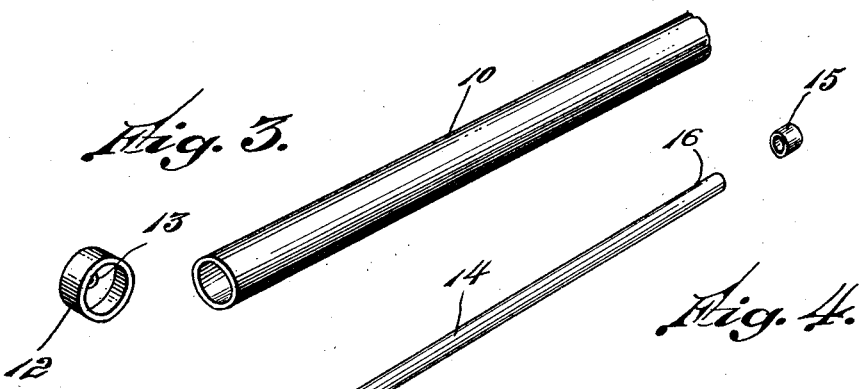
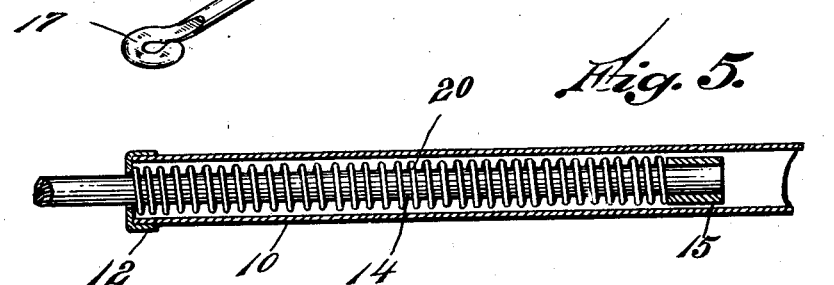
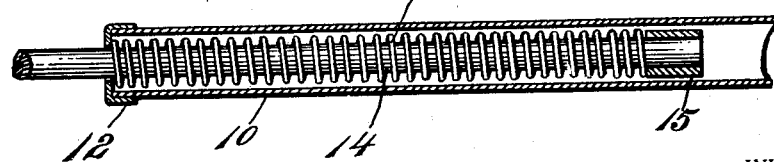
INVENTOR.
Louis A. Page.
BY Barlow & Barlow
ATTORNEYS.

Patented Apr. 19, 1927.

1,625,050

UNITED STATES PATENT OFFICE.

LOUIS A. PAGE, OF PROVIDENCE, RHODE ISLAND, ASSIGNOR OF ONE-HALF TO HARRY C. MESSINGER, OF PROVIDENCE, RHODE ISLAND.

EXTENDIBLE SPECTACLE TEMPLE.

Application filed January 21, 1926. Serial No. 82,678.

This invention relates to an extendible temple for spectacle frames, and has for its object to provide a tubular shank member having an ear-engaging loop portion at one end thereof and within the tube is mounted a wire core to move endways therein, the core having one end extending beyond the end of the tube to be hinged to the eyeglass frame and a spring being mounted in the tube to act between the core and tube to permit an extending action of the temple.

A further object of the invention is to form the core substantially the length of the shank portion of the temple and provide an enlargement on the inner end of the core and a cap on the outer end of the tube through which the outer end of the core extends and slides and to mount a coiled spring in the tube to act between the cap on the tube and the enlargement on the core to yieldingly permit a relative axial movement between the tube and core to extend the operating length of the temple, the end of the core extending beyond the tube to be hinged to the eyeglass frame providing an extremely soft flexible action of the loop which hooks over the back of the ear to prevent excessive pull or pressure which would irritate the tender flesh of the wearer.

With these and other objects in view, the invention consists of certain novel features of construction, as will be more fully described, and particularly pointed out in the appended claims.

In the accompanying drawings:

Figure 1 is a sectional side elevation illustrating my improved temple as connected to a lens frame.

Figure 2 is a sectional side elevation showing the outer end of the core member as extending beyond the end of the tubular shank.

Figure 3 shows a section of tubular shank portion with the cap removed from its end.

Figure 4 shows a length of core wire with the enlargement or abutment collar removed from its end.

Figure 5 is an enlarged sectional elevation showing the spring in the tube as acting upon the core to draw the two into contracted position.

It is found in the practical operation of spectacle temples of the type which have a loop adapted to extend over back of the ear of the wearer to be of great importance that these temples engage the back of the ear softly and without undue tension owing to the fact that the flesh behind the ear is extremely sensitive and tender; and to accomplish this by the old method the wire loops were bent to fit each individual wearer which often times, if not most carefully adjusted, would injure or abrade the flesh and were most uncomfortable to the wearer. To obviate this objection, I have provided a tubular temple member, one end of which is preferably formed to pass over back of the ear of the wearer and in this tubular temple I have mounted an elongated core which extends substantially the length of the tubular shank portion of the temple, the inner end of the core being provided with an enlarged abutment and the outer end of the tube being provided with a cap through which the outer end of the core extends and receives a bearing, and a light spring of extended length is mounted in the tube to act between the opposite abutments to permit a yielding extending movement of the tube on the core so as to accommodate itself to the faces of the different wearers and apply a soft, yielding, comfortable pressure which is just sufficient to retain the spectacles on the face of the wearer without abrading the tender flesh back of the ear; and the following is a detailed description of the present embodiment of my invention and showing one construction of temple by which these advantageous results may be accomplished:—

With reference to the drawings, 10 designates the shank portion of my improved temple which is formed of tubing and this tubing is bent as at 11 into loop form to extend over around back of the ear of the wearer, the opposite end of this tubing being provided with a cap 12 which has a bearing opening 13 therein.

Within this tube is mounted a core 14 of a length preferably substantially that of the straight part of the shank of the temple. The inner end of this core being provided with an enlargement or collar 15 which may be soldered on to the end 16 of this core to serve both as an abutment for the spring and also as a guide for this end in the tube. The outer end of this core extends through the opening 13 in the cap 12 and is preferably flattened and bent into eye form as at 17 to be pivotally connected to the end member 18 of the eyeglass frame 19. Within the tubing 10 is mounted a light coiled spring 20, one end of which abuts against the enlargement 15 on the core wire and the other end abuts against the end cap 12 on the tube thus permitting a relatively extending action of the tube and core so as to provide a soft or yielding pressure on the back of the ear of the wearer to hold the glasses in proper position on his face.

By my improved construction, it will be noted that I have provided an elongated bearing for the core in the tube and have provided for a light spring of extended length in the tube whereby a very soft and yielding action of the temple is permitted. Then again, the outer end of the core wire 14 is pivoted to the frame in axial alignment with the pull of the temple, which offers the minimum resistance to an elongated action of the tube on its core.

My improved extendible temple is very simple and practical in construction, is effective in its action and by its use eyeglasses may be held very flexibly and yet without objectionable pressure in the most advantageous operating position on the face of the wearer.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A temple for spectacle frames having an elongated tubular shank with an ear-engaging loop portion at one end thereof, a cap on the other end of the tube, a wire core in the tube having an abutment thereon, a spring in the tube about the core acting between said cap and abutment to yieldingly permit a relative extending action of the tube and core, the outer end of the core being hinged to the frame.

2. An extendible temple for spectacle frames having a long straight tubular shank portion, one end of the tubular portion being bent into loop form to extend over back of the ear of the wearer, a cap on the opposite end of the tube, a wire core in the tube extending substantially the length of the shank portion thereof, the inner end of the core having a collar member secured thereto, the outer end of the core formed into a pivoting eye, and a coil spring in the tube acting between said cap and collar to permit a flexible extension movement of the tube in its core.

In testimony whereof I affix my signature.

LOUIS A. PAGE.